(12) United States Patent
Omeragic et al.

(10) Patent No.: US 9,715,034 B2
(45) Date of Patent: Jul. 25, 2017

(54) METHOD FOR MULTI-TUBULAR EVALUATION USING INDUCTION MEASUREMENTS

(71) Applicant: SCHLUMBERGER TECHNOLOGY CORPORATION, Sugar Land, TX (US)

(72) Inventors: Dzevat Omeragic, Lexington, MA (US); Saad Omar, Somerville, MA (US)

(73) Assignee: SCHLUMBERGER TECHNOLOGY CORPORATION, Sugar Land ( * ) Notice: Subject to any disclaimer, the term of this patent is extended or adjusted under 35 U.S.C. 154(b) by 45 days.

(21) Appl. No.: 14/973,887

(22) Filed: Dec. 18, 2015

(65) Prior Publication Data
US 2017/0176629 A1    Jun. 22, 2017

(51) Int. Cl.
*G01V 3/00*    (2006.01)
*G01V 3/38*    (2006.01)
*G01V 3/28*    (2006.01)
*G01V 11/00*   (2006.01)

(52) U.S. Cl.
CPC ............. *G01V 3/38* (2013.01); *G01V 3/28* (2013.01); *G01V 11/002* (2013.01)

(58) Field of Classification Search
CPC . G01V 3/088; G01V 3/20; G01V 3/24; G01V 3/12; G01V 3/30; G01V 3/28; G01V 3/38; G01N 27/72; G01N 27/82; G01N 27/90; G01N 27/902; G01N 27/904; E21B 47/082; E21B 47/09; E21B 47/18; E21B 47/024; E21B 47/102; E21B 47/185
See application file for complete search history.

(56) References Cited

U.S. PATENT DOCUMENTS

| | | | |
|---|---|---|---|
| 6,836,218 B2 * | 12/2004 | Frey | E21B 47/011 324/338 |
| 7,640,110 B2 | 12/2009 | Abubakar et al. | |
| 7,960,969 B2 | 6/2011 | Mouget et al. | |

(Continued)

OTHER PUBLICATIONS

Abubakar et al., "A 3D parametric inversion algorithm for triaxial induction data", Geophysics, vol. 71, No. 1, Jan.-Feb. 2006, pp. G1-G9.

(Continued)

*Primary Examiner* — Minh N Tang
(74) *Attorney, Agent, or Firm* — Michael Dae

(57) ABSTRACT

A method includes obtaining, with a plurality of receivers of a logging tool, a set of induction, multi-spacing, multi-frequency measurements of a plurality of nested casings. The method also includes inverting, with a processor, the set of measurements for magnetic permeability or electrical conductivity. The method further includes calibrating, with the processor, the set of measurements using differences between measured responses of the logging tool, and simulated responses of the logging tool resulting from inverting the set of measurements for the magnetic permeability or electrical conductivity of the plurality of nested casings, to determine a calibrated set of measurements. The method also includes inverting, with the processor, the calibrated set of measurements for thickness of individual casings of the plurality of nested casings, to determine the thickness of the individual casings.

20 Claims, 10 Drawing Sheets

(56) References Cited

U.S. PATENT DOCUMENTS

| | | |
|---|---|---|
| 8,332,191 B2 | 12/2012 | Rosthal et al. |
| 8,614,578 B2 | 12/2013 | Gao et al. |
| 8,958,989 B2 | 2/2015 | Legendre et al. |
| 9,562,877 B2 * | 2/2017 | Khalaj Amineh ...... E21B 47/00 |
| 2013/0193953 A1 | 8/2013 | Yarbro et al. |
| 2016/0109610 A1 * | 4/2016 | Donderici ............. E21B 47/102 |
| | | 324/333 |

OTHER PUBLICATIONS

Brill et al., "Electromagnetic Casing Inspection Tool for Corrosion Evaluation", IPTC 14865 presented at the International Petroleum Technology Conference held in Bangkok, Thailand, Feb. 7-9, 2012, pp. 1-14.

Constable et al., "Occam's inversion: A practical algorithm for generating smooth models from electromagnetic sounding data", Geophysics, vol. 52, No. 3, Mar. 1987, pp. 289-300.

Farquharson et al., "A comparison of automatic techniques for estimating the regularization parameter in non-linear inverse problems", Geophysical Journal International, 2004, vol. 156, Issue 3, pp. 411-425.

Habashy et al., "A General Framework for Constraint Minimization for the Inversion of Electromagnetic Measurements", Progress in Electromagnetic Research, PIER 46, 2004, pp. 265-312.

Thiel et al., "Optimization of LWD deep directional resistivity measurement set for real-time well placement based on information content analysis", Schlumberger Journal of Modeling and Simulation, vol. 6, Aug. 2015, pp. 139-144.

Wu et al., "Influence of steel casings on electromagnetic signals", Geophysics, vol. 99, No. 3, Mar. 1994, pp. 378-390.

* cited by examiner

ECCENTRIC CASING 1

CASING 1:
OUTER DIAMETER (IN INCHES) = 2.875
THICKNESS (IN INCHES) = 0.217
CENTER (IN INCHES) = (0,0,0)

CASING 2:
OUTER DIAMETER (IN INCHES) = 7.000
THICKNESS (IN INCHES) = 0.317
CENTER (IN INCHES) = (1.25,0,0)

CASING 3:
OUTER DIAMETER (IN INCHES) = 9.625
THICKNESS (IN INCHES) = 0.395
CENTER (IN INCHES) = (1.5,0,0)

CASING 4:
OUTER DIAMETER (IN INCHES) = 13.375
THICKNESS (IN INCHES) = 0.15:0.05:0.65
CENTER (IN INCHES) = (2.65,0,0)

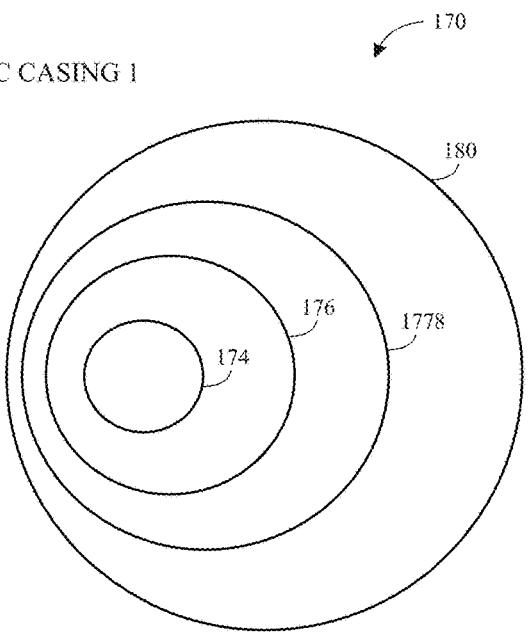

FIG. 7

ECCENTRIC CASING 2

CASING 1:
OUTER DIAMETER (IN INCHES) = 2.875
THICKNESS (IN INCHES) = 0.217
CENTER (IN INCHES) = (0,0,0)

CASING 2:
OUTER DIAMETER (IN INCHES) = 7.000
THICKNESS (IN INCHES) = 0.317
CENTER (IN INCHES) = (1.25,0,0)

CASING 3:
OUTER DIAMETER (IN INCHES) = 9.625
THICKNESS (IN INCHES) = 0.395
CENTER (IN INCHES) = (1.5,0,0)

CASING 4:
OUTER DIAMETER (IN INCHES) = 13.375
THICKNESS (IN INCHES) = 0.15:0.05:0.65
CENTER (IN INCHES) = (0.5,0,0)

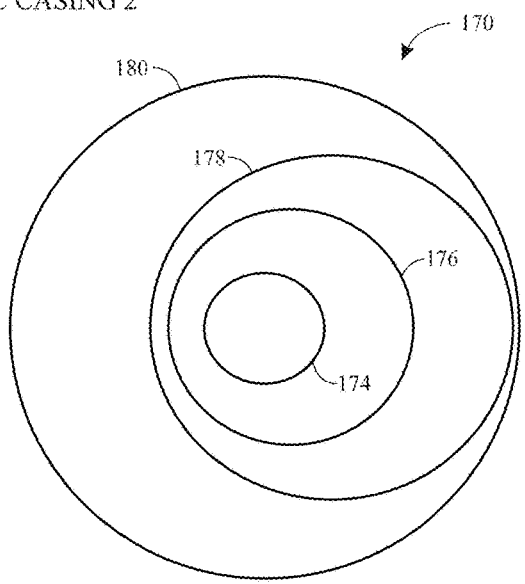

FIG. 8

METHOD FOR MULTI-TUBULAR EVALUATION USING INDUCTION MEASUREMENTS

BACKGROUND

The present disclosure relates to evaluating thickness of nested tubular (e.g., casings) using induction measurements performed by a downhole logging tool. Specifically, the present disclosure relates to evaluating thickness of an individual casing among the nested casings.

This section is intended to introduce the reader to various aspects of art that may be related to various aspects of the present techniques, which are described and/or claimed below. This discussion is believed to help provide the reader with background information to facilitate a better understanding of the various aspects of the present disclosure. Accordingly, it should be understood that these statements are to be read in this light, and not as an admission.

In well logging via electromagnetic field testing, such as remote field eddy current (RFEC), a field-testing probe is slid within an interior diameter of a conductive tubular or casing. A transmitter of the field-testing probe induces an electromagnetic field that interacts with the casing. The electromagnetic field varies depending on thickness and/or corrosion in the casing. Receivers may detect these variations in the electromagnetic field, and interpretation of these variations may be based on far field approximation of the detectable electromagnetic field. Based on these detected variations, the effective thickness and/or corrosion of the casing may be determined. However, RFEC measurements primarily reflect changes to overall thickness of the casings rather than individual casings.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a system includes a plurality of nested casings disposed in a well. The system also includes an electromagnetic logging tool disposed in the plurality of nested casings, wherein the electromagnetic logging tool comprises one or more transmitters and a plurality of receivers. The system further includes a data processing system communicatively coupled to the electromagnetic logging tool, wherein the data processing system comprises one or more processors. The one or more processors are configured to obtain a set of induction, multi-spacing, multi-frequency measurements of the plurality of nested casings. The one or more processors are also configured to invert the set of measurements for a set of characteristics of the plurality of nested casings. The one or more processors are further configured to calibrate the set of measurements using differences between measured responses of the electromagnetic logging tool, and simulated responses of the electromagnetic logging tool resulting from inverting the set of measurements for the one or more known values of the set of characteristics. The one or more processors are also configured to invert the calibrated set of measurements for a first characteristic of individual casings of the plurality of nested casings to determine data corresponding to the first characteristic of the individual casings.

In a second embodiment, a tangible, non-transitory, machine-readable medium, includes machine-readable instructions to obtain a set of induction, multi-spacing, multi-frequency measurements of a plurality of nested casings using a logging tool. The tangible, non-transitory, machine-readable medium, also includes machine-readable instructions to invert the set of measurements for a set of characteristics of the plurality of nested casings. The tangible, non-transitory, machine-readable medium, further includes machine-readable instructions to calibrate the set of measurements using differences between measured responses of the logging tool, and simulated responses of the logging tool resulting from inverting the set of measurements for the one or more known values of the set of characteristics. The tangible, non-transitory, machine-readable medium, also includes machine-readable instructions to invert the calibrated set of measurements for a first characteristic of individual casings of the plurality of nested casings to determine data corresponding to the first characteristic of the individual casings.

In a third embodiment, a method includes obtaining, with a plurality of receivers of a logging tool, a set of induction, multi-spacing, multi-frequency measurements of a plurality of nested casings. The method also includes inverting, with a processor, the set of measurements for magnetic permeability or electrical conductivity. The method further includes calibrating, with the processor, the set of measurements using differences between measured responses of the logging tool, and simulated responses of the logging tool resulting from inverting the set of measurements for the magnetic permeability or electrical conductivity of the plurality of nested casings, to determine a calibrated set of measurements. The method also includes inverting, with the processor, the calibrated set of measurements for thickness of individual casings of the plurality of nested casings, to determine the thickness of the individual casings.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 7 is a diagram of eccentered synthetic casings;

FIG. 8 is a diagram of eccentered synthetic casings;

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to devices and methods for measuring metal thickness in individual casings among a plurality of nested casings and disposed in a well using a measurement probe with a transmitter an a plurality of receivers. In particular, inversion techniques may be used to determine one or more characteristics of individual casings, such as thickness, center of casing cross-section, eccentering, magnetic permeability (e.g., relative magnetic permeability), and/or electrical conductivity.

Figure 1:
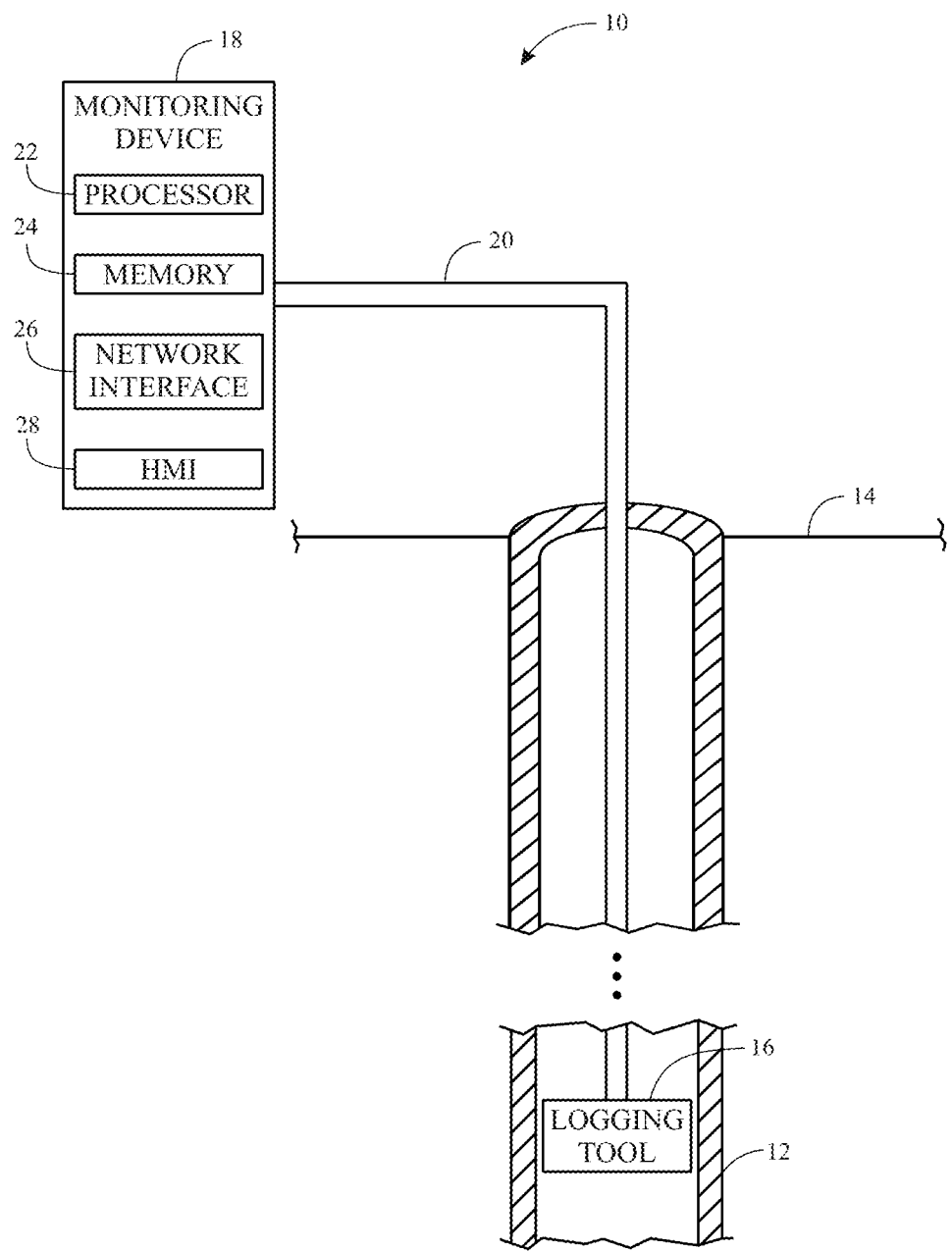
FIG. 1 is a block diagram of an electromagnetic measurement system, in accordance with an embodiment of the present disclosure.

With the foregoing in mind, FIG. 1 is a block diagram of an electromagnetic measurement system 10 that may be used to determine thickness (e.g., 0.1 inches to 4 inches) and/or defects due to corrosion of one or more casings 12, in accordance with an embodiment of the present disclosure. For example, an outer surface of the one or more casings 12 may be corroded by contact with earth and/or fluids. In some embodiments, the casings 12 may be measured while within the earth 14, water, and/or air. The electromagnetic measurement system 10 includes an electromagnetic logging tool 16 that may be lowered into the one or more casings 12. The logging tool 16 generates a time-varying magnetic field signal that interacts with the casings 12 having conductive and magnetic properties. The logging tool 16 may be energized from the surface or have its own internal power used to emit the time-varying magnetic field signal. The magnetic field signal closes outwards from the logging tool 16 through and along the casings 12. The magnetic field signal from the logging tool 16 may therefore generate eddy currents in the casings 12 and induce corresponding secondary magnetic field signals. As will be discussed below, the logging tool 16 may detect the secondary magnetic field signals. In areas of metal loss in the casings 12, the secondary magnetic field signal may arrive at the logging tool 16 with less phase change and/or greater signal strength (e.g., higher amplitude) than otherwise, owing to the reduced path through the one or more casings 12. Similarly, in areas of metal gain (with respect to nominal thickness, e.g., due to casing collars) in the casings 12, the secondary magnetic field signal may arrive at the logging tool 16 with greater phase change and/or lesser signal strength (e.g., lower amplitude) than otherwise, owing to the increased path through the one or more casings 12.

The logging tool 16 may be coupled to a monitoring device 18 via a communication link 20 that maintains connection between the logging tool 16 and the monitoring device 18 as the logging tool 16 traverses the length of the one or more casings 12. The monitoring device 18 may include a data processing system that includes a processor 22, a memory 24, a network interface 26, a human machine interface (HMI) 28, and/or other electronic components suitable for monitoring and/or analyzing measurements of the logging tool 16 and relaying that information to an appropriate destination such an end user and/or log.

In the monitoring device 18, the processor(s) 22 and/or other data processing circuitry may be operably coupled with the memory 24 to execute instructions. Such programs or instructions executed by the processor(s) 22 may be stored in any suitable article of manufacture that includes one or more tangible, non-transitory, machine-readable media at least collectively storing the instructions or routines, such as the memory 24. The memory 24 may include any suitable articles of manufacture for storing data and executable machine-readable instructions, such as RAM, ROM, rewritable flash memory, hard drives, and optical discs. Also, programs (e.g., an operating system) encoded on such a computer program product may also include instructions that may be executed by the processor(s) 22. In some embodiments, the logging tool 16 may include one or more processors that perform at least a portion of the below-described processing. Further references to "the processor 22" include the processor 22 of the monitoring device 18, as well as any processor included in the logging tool 16.

The network interface 26 may include circuitry for communicating over one more networks. For example, the network interface 26 may include interfaces for a personal area network (PAN), such as a Bluetooth network, for a local area network (LAN), such as an 802.11x Wi-Fi network, and/or for a wide area network (WAN), such as a 3G, 4G, or LTE cellular network.

The HMI 28 may include one or more input and/or output devices for enabling communication between the processor 22, the memory 24, the network interface 26, and one or more users. In some embodiments, the HMI 28 may include one or more input devices and one or more output devices. For example, in certain embodiments, the HMI 28 may include a display and/or a keyboard, a mouse, a touch pad, or other input devices suitable for receiving inputs from a user. In some embodiments, the HMI 28 may include a touch-screen liquid crystal display (LCD), for example, which may enable users to interact with a user interface of the monitoring device 18.

Figure 2:
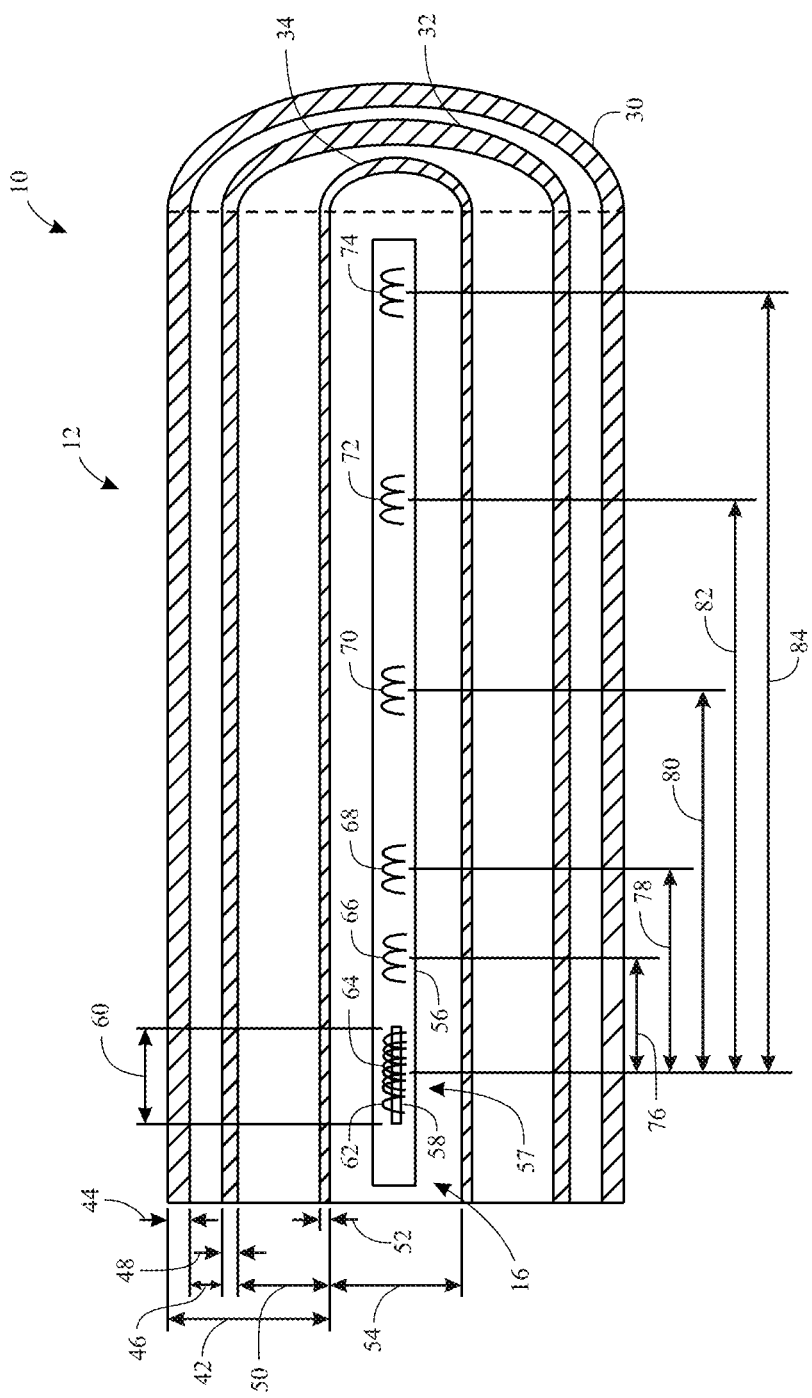
FIG. 2 is a cross-sectional view of an electromagnetic measurement system, in accordance with an embodiment of the present disclosure.

FIG. 2 is a cross-sectional view of the electromagnetic measurement system 10 located inside the one or more casings 12, in accordance with an embodiment of the present disclosure. The illustrated embodiment of the casing 12 includes an outer casing thickness 44, an outer spacing 46, a middle casing thickness 48, a middle spacing 50, and an inner casing thickness 52. Although the illustrated embodiment illustrates three casings with a total thickness 42 including an outer casing 30, a middle casing 32, and an inner casing 34, other embodiments may include 1, 2, 3, 4, 5, or more casings. The total thickness 42 of the casings includes the sum of the thicknesses of casing thicknesses 44, 48, 52. In some embodiments, the casings may include a production tubing, an intermediate casing, a surface casing, and a conductor casing. In some embodiments, one or more of the spacings may include structural but substantially nonconductive material, such as cement. The logging tool 16 traverses the casings 12 within an inner diameter 54 of the casings 12 located at the center of the casings 12. In certain embodiments, the logging tool 16 includes a housing 56 that encloses the logging tool 16 components. In some embodiments, the housing 56 may be a pressure-resistant housing. Within the housing 56, the logging tool 16 includes one or more transmitters 57 that includes a transmitter magnetic core 58 having a length 60. In some embodiments, the transmitter magnetic core 58 may be magnetic and made of silicon steel. In some embodiments, two windings may be located around the transmitter magnetic core 58: a transmission winding 62 and a monitor winding 64. In some embodiments, the transmitter magnetic core 58 may be wound around by a single transmission winding 62.

The logging tool 16 also may include a plurality of receivers (e.g., 66, 68, 70, 72, 74). The present disclosure contemplates any number of receivers greater than one. In the illustrated embodiment, the receivers 66, 68, 70, 72, 74 are each located in a line along the logging tool 16. Each receiver 66, 68, 70, 72, 74 is located some distance away from the transmitter 57. For example, the receiver 66 may be located a distance 76 from the transmitter 57, the receiver 68 may be located a distance 78 from the transmitter 57, the receiver 70 may be located a distance 80, the receiver 72 may located a distance 82 from the transmitter 57, and the receiver 74 may be located a distance 84 from the transmitter 57. In certain embodiments, each distance 78, 80, 82, and 84 may be a multiple of the distance 76. For example, the distance 78 may be twice the distance 76, and distances 80, 82, and 84 may respectively be three, four, and five times the distance 78. Furthermore, in some embodiments, the distance 76 may be less than, greater than, or equal to the length 60. In certain embodiments, the receivers 66, 68, 70, 72, 74 may be located at distances of between 7 inches or less to 120 inches or more from the transmitter 57. For example, the receivers 66, 68, 70, 72, 74 may be located 18, 36, 60, 80, and 90 inches away from a center of the transmitter 57. The receivers 66, 68, 70, 72, 74 may detect the strength and/or phase of the secondary magnetic field from the casing 12. These detected values may then be used to determine a thickness of the casing(s) 12 using any suitable electromagnetic measurement analyses. Although the receivers 66, 68, 70, 72, 74 are illustrated as axially located receivers, in some embodiments, at least some of the receivers 66, 68, 70, 72, 74 may be located azimuthally adjacent to an inner wall of the casing. In certain embodiments, at least some of the receivers 66, 68, 70, 72, 74 may have an azimuthal sensitivity (e.g., saddle coils, Hall-effect sensor, or giant magneto-resistive sensor) that may detect defects or transverse cracks in the casing 12. There may be embodiments having multiple transmitter configurations where the windings are transverse or obliques as in a saddle coil arrangement which couple to these receiver or additional receiver windings. In some embodiments, one or more of the receivers 66, 68, 70, 72, 74 may include a core. In some embodiments, one or more of the receivers 66, 68, 70, 72, 74 may not include a core.

The logging tool 16 may operate at any suitable number of frequencies. For example, the logging tool 16 may operated from 0.1 to 50 Hertz (Hz). In some embodiments, the logging tool 16 may operate at 7 fundamental frequencies: 0.5469, 1.09375, 2.1875, 4.375, 8.75, 17.5, and 35 Hz. The logging tool 16 may also acquire data from odd harmonics, e.g., from a square wave-based transmitter source. The same approach may be applied to transient electromagnetic measurements by applying a Fast Fourier transform algorithm to waveforms and handling the result as multi-frequency data.

Figure 3:
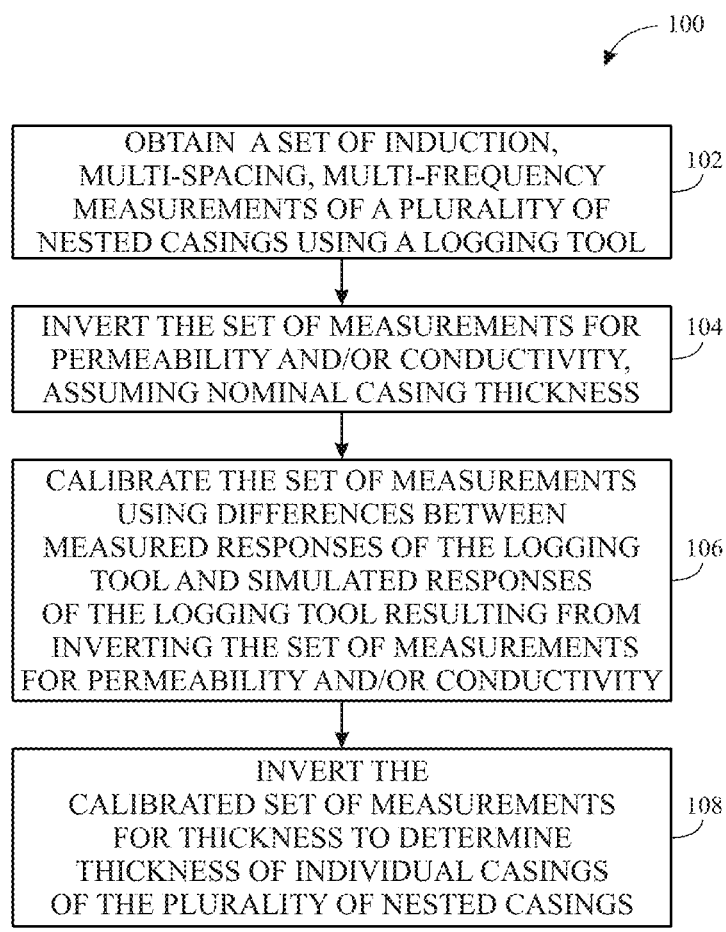
FIG. 3 a flowchart of a method for determining thicknesses of individual casings among a plurality of nested casings, in accordance with an embodiment of the present disclosure.

Turning now to FIG. 3, a flowchart of a method 100 for determining thicknesses of individual casings (e.g., 30, 32, 34) among a plurality of nested casings (e.g., 12) using a set of induction multi-spacing and multi-frequency measurements, in accordance with an embodiment of the present disclosure, is illustrated. The processor 22 controls the logging tool 16 to obtain (block 102) a first set of induction, multi-spacing, multi-frequency measurements of the plurality of nested casings 12. That is, the processor 22 controls the transmitter 57 of the logging tool 16 to emit a time-varying magnetic field signal towards the plurality of nested casings 12. The time-varying magnetic field signal induces corresponding secondary magnetic field signals in the plurality of nested casings 12, detected by the plurality of receivers (e.g., 66, 68, 70, 72, and/or 74) of the logging tool 16.

The processor 22 inverts (block 104) the set of measurements for one or more characteristics of the plurality of nested casings 12. In particular, the processor 22 inverts the set of measurements for magnetic permeability and/or electrical conductivity of the plurality of nested casings 12, assuming a nominal thickness of the plurality of nested casings 12. The processor 22 may assume that the permeability and/or conductivity of each casing 12 is the same for all casings 12. The results of the method 100 may be more accurate if the set of measurements is inverted for more than one characteristic, e.g., both permeability and conductivity. Inversion minimizes a cost function in terms of difference between a modeled tool response (e.g., a response of the logging tool 16) and actual measurements by the logging tool 16, sometimes referred as the error term, through adjusting a multi-string casing model, defined by geometry and properties. The cost function may be augmented with an additional regularization term. The balance between the error and regularization is typically determined heuristically (see Dennis, Jr., J. E., and Robert B. Schnabel, *Numerical Methods for Unconstrained Optimization and Nonlinear Equations*, SIAM Classics in Applied Mathematics, 1996; see also Nocedal, Jorge and Stephen J. Wright, *Numerical Optimization*, $2^{nd}$ ed., Springer Series in Operations Research, 2006) or is managed by the adaptive regularization methods (see Constable, Steven C., and Robert L. Parker and Catherine G. Constable, *Occam's inversion: A practical algorithm for generation smooth models from electromagnetic sounding data*, Geophysics, vol. 52, no. 3, pp. 289-300, 1987; see also Farquharson, Colin G., and Douglas W. Oldenburg, *A comparison of automatic techniques for estimating the regularization parameter in nonlinear inverse problems*, Geophys. J. Int., 2004 156, pp. 411-425).

Inversion minimizes the cost function in terms of the difference between the modeled tool response $s(x)$ with unknown model parameters x and the actual measurements m. The unknown model may include centered or eccentered casings 12. A software program that may perform electromagnetic simulation of sensor responses with variable properties, such as thickness, center of casing cross-section, eccentering, permeability, and conductivity of the casings 12, may be used in an inversion loop to compare the simulated responses to measured sensor responses. For the error $e(x)$ function:

$$e(x)=|s(x)-m|, \quad (1)$$

the cost function may be defined in a least squares sense as:

$$C(x)=\tfrac{1}{2}[\|W \cdot e(x)\|^2+\lambda\|W_x \cdot (x-x_{ref})\|^2] \quad (2)$$

where W is a data weighting matrix that may be determined to be as close as possible to an expected standard deviation ($\sigma_i$) of corresponding measurement channels $W_d$=diag$(1/\sigma_i)$, $W_x$ is parameter weighting matrix of the regularization term, and X is regularization constant.

The model parameters x may be obtained by minimization of the cost function:

$$x^*=\min_x[C(x)]. \quad (3)$$

The model parameters x may be bounded by box constraints, such that ($x_{min} \le x \le x_{max}$).

For a given parameter set x, the cost function is linearized, such that:

$$e(x+p) \approx e(x)+J(x) \cdot p \quad (4)$$

where $J(x)$ is a Jacobian matrix and may contain first derivatives of a simulation response:

$$(J(x))_{ij} = \frac{\partial e_i}{\partial x_j}(x) = \frac{\partial s_i}{\partial x_j}(x) \quad (5)$$

and the step p that decreases the cost function is determined iteratively until convergence.

A linearized error term is inserted in the cost function, such that the linearized cost function is:

$$C(x+p) \approx L(p) = C(x)+g(x) \cdot p+\tfrac{1}{2}p^T \cdot H(x) \cdot p \quad (6)$$

with a gradient:

$$g(x)=J^T \cdot W^T \cdot W \cdot e(x)+\lambda W_x^T \cdot W_x \cdot (x-x_{ref}) \quad (7)$$

and a Hessian matrix:

$$H(x)=J^T \cdot W^T \cdot W \cdot J+\lambda W_x^T \cdot W_x. \quad (8)$$

The regularization term is added to the cost function to bias the solution towards $x_{ref}$. It is chosen as the previous step value in order to penalize large changes in parameter values. The regularization constant $\lambda$ is proportional to a squared error term:

$$\lambda=\lambda_{input}\|W \cdot e(x)\|^2, \quad (9)$$

and decreases a bias of the inversion with progression towards a global minimum (see U.S. Pat. No. 7,640,110, Abubakar, A., T. M. Habashy, V. Druskin, S. Davydycheva, and L. Knizhnerman, *A three-dimensional parametric inversion algorithm for triaxial induction logging data*, Geophysics, Vol. 71, No. 1, January 2006).

The Huber inversion may be used, as it is robust to data outliers and noise. As such, the error term of the cost function becomes:

$$\chi^2 = \sum_i \varphi(w_i \cdot e_i(x)) \quad (10)$$

with the Huber function:

$$\varphi(y) = \begin{cases} y^2 & |y| < \Delta \\ 2\delta(|y|-0.5\Delta) & |y| > \Delta \end{cases} \quad (11)$$

where y corresponds to the error (the difference between the model response and the actual measurements) and $\Delta$ is a threshold where the error calculation changes from squared to linear.

The inversion can resolve any subset of following parameters:

1. thickness $th_i$ of each casing 12;
2. cross-section center $c_i$ of each casing 12;
3. relative magnetic permeability $\mu_i$ of the plurality of casings 12; and
4. electric conductivity $\sigma_i$ of the plurality of casings 12.

The inversion model may assume that metal loss on the inside and the outside of the casings 12 is identical. The inversion model may also assume that the casings 12 are centered. The inversion model parameterization also enables inverting for the inner and/or outer diameter of individual casings (e.g., 30, 32, 34), which may be useful when there is sufficient information to resolve these parameters (e.g., from the measurement data and/or from some other data, such as ultrasonic measurements).

The results of the inversion may be processed to increase resolution and accuracy. A data resolution matrix is defined in terms of sensitivities (Jacobian matrix, J) and may include the data weight and the regularization terms used in the inversion (see Thiel, Michael, Dzevat Omeragic, and Tarek Habashy, *Optimization of LWD deep directional resistivity measurement set for real-time well placement based on*

*information content analysis*, Schlumberger Journal of Modeling and Simulation, vol. 6, pp. 139-144, August 2015):

$$\hat{m} = R^{data} \cdot m^{obs} = J[J^T W^T W J + \lambda W_x^T W_x]^{-1} J^T W^T W \cdot m^{obs}. \quad (12)$$

A symmetrized version of $R^{data}$ may be used to analyze off-diagonal elements of $R^{data}$ and a dependence of one reconstructed data point on the other data points, $$R_{sym}^{data} = WJ[J^T W^T W J + \lambda W_x^T W_x]^{-1} J^T W^T. \quad (13)$$

The uncertainty in the inverted parameters may be derived from the Hessian matrix H, as illustrated in Equation 8 above. Additionally, the error term $\chi^2$ may be expressed as illustrated in Equation 10 above. As such, the mathematical uncertainty $\sigma_j$ in the $j^{th}$ inverted parameter is given by:

$$\sigma_j = \sqrt{\chi^2 [H^{-1}]_{j,j}}. \quad (14)$$

Similarly, correlation of the inverted parameters i and j may be obtained from normalized off-diagonal elements of the inverted Hessian matrix:

$$[C_x]_{i,j} = [H^{-1}]_{i,j} / \sqrt{[H^{-1}]_{i,i} [H^{-1}]_{j,j}} \quad (15)$$

Using the inversion model, the processor 22 may invert (block 102) the set of induction, multi-spacing, multi-frequency measurements acquired inside of the plurality of nested casings 12 for casing magnetic permeability and electric conductivity, assuming a nominal thickness of all casings. The nominal thickness may be an original thickness of the casing 12 before being installed in the well. In some embodiments, the nominal thickness may be the original thickness of the casing 12, minus an estimation or a measurement of degradation based on the time the casing 12 has been in the well. In some embodiments, the nominal thickness may be constrained for thickness of first casing string or internal radii based on external information obtained from some other tool, such as ultrasonic measurement or other high frequency electromagnetic sensor. The inversion may be more effective when performed on a data section of the set of measurements (i.e., a calibration interval) that exhibits minimal perturbation (as a result of minimal corrosion to the casing 12).

The processor 22 calibrates (block 106) the set of measurements using differences between measured responses of the logging tool 16, and simulated responses of the logging tool 16 resulting from inverting (block 102) the set of measurements for casing magnetic permeability and/or electric conductivity. That is, the magnetic permeability and electrical conductivity of each casing 12, determined in block 104, is used to calibrate the set of measurements from block 102. The set of measurements may be calibrated, such that differences between the measured and simulated tool responses for the inversion model, corresponding to casing permeability and/or conductivity, are zeroed over the calibration interval.

The processor 22 inverts (block 108) the calibrated set of measurements to determine thickness of the individual casings (e.g., 30, 32, 34) of the plurality of nested casings 12. In particular, the inversion techniques as discussed above may be used to invert the calibration offsets of the set of measurements, along with the thickness of the individual casings (e.g., 30, 32, 34).

Figure 4:
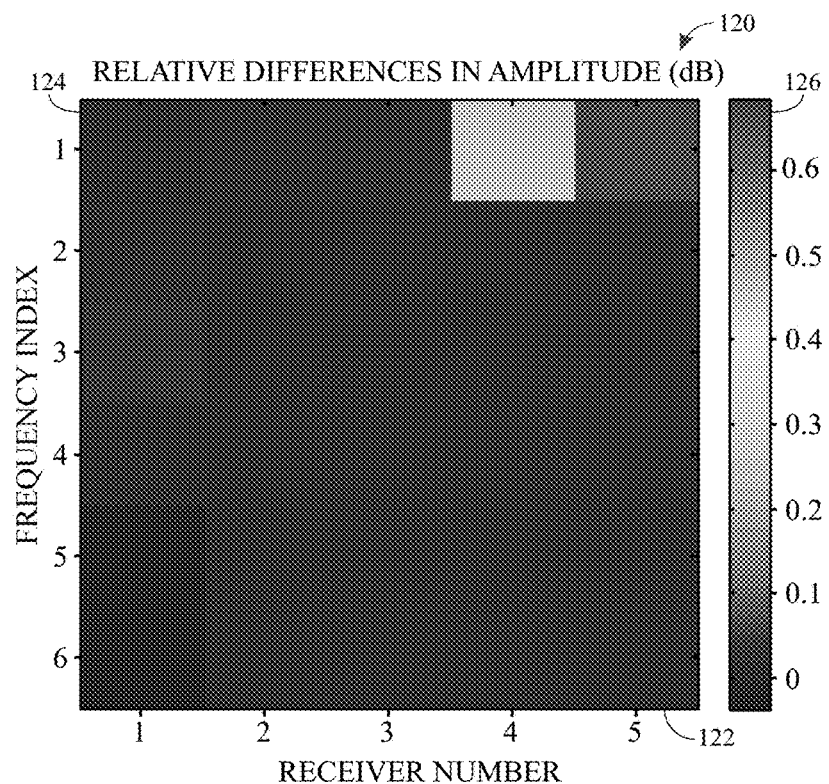
FIG. 4 is a plot of the relative difference in amplitude between synthetic data and data modeled with the inversion techniques, in accordance with an embodiment of the present disclosure.
Figure 5:
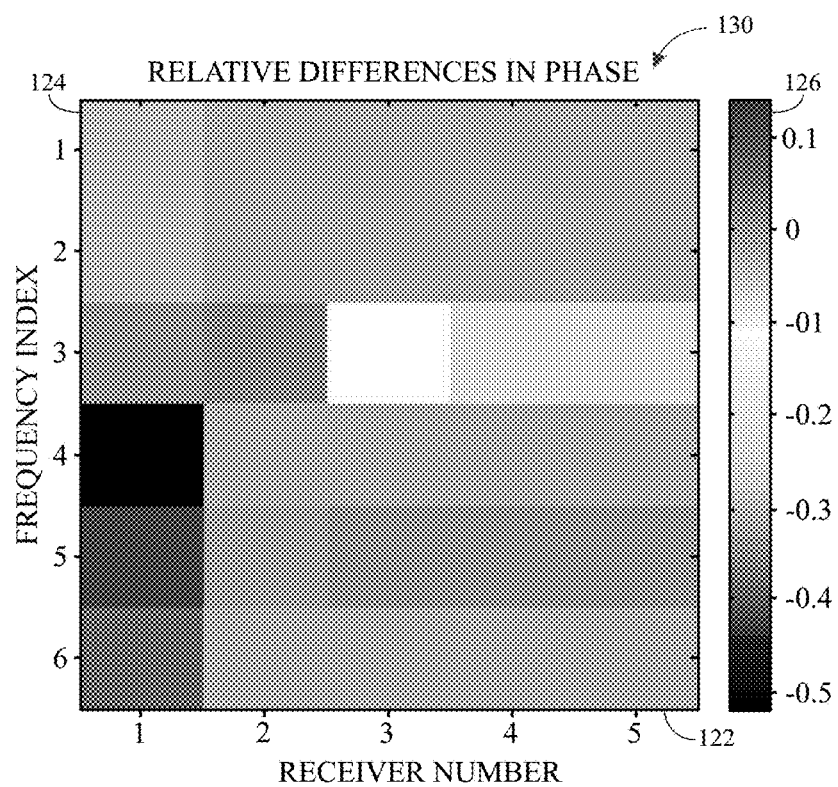
FIG. 5 is a plot of the relative difference in phase between synthetic data and data modeled with the inversion techniques, in accordance with an embodiment of the present disclosure.

Turning now to FIGS. 4 and 5, plots 120, 130 of relative differences between noisy synthetic (i.e., simulated) and accurate modeled data for two casings test configurations are shown. In particular, the source of random noise in the synthetic data was due to low-accuracy numerical discretization. Thirty-six sets of synthetic data for two nested casings were generated to test the inversion techniques described above. The modeled casings have a relative permeability ($\mu_r$) of 80 and conductivity ($\sigma$) of 5×10$^6$ Siemens per meter (S/m). The inner casing has an outer diameter of 4.5 inches (in) and corrosion on the inner surface, which may reduce the nominal thickness of the inner synthetic casing from 0.6 in to 0.0 in. The outer casing has outer diameter of 7 in and corrosion on the inner surface, which may reduce the nominal thickness of the outer casing from 0.8 in to 0.0 in. The sets of synthetic data include measured signal for five receivers of the logging tool 16 for frequencies of 1.0954, 2.1875, 4.375, 8.75, 17.5 and 35 Hz. FIG. 4 is a plot 120 of the relative difference in amplitude (in dB) between noisy synthetic data and data simulated for nominal casing thicknesses using modeling code used in the inversion, in accordance with an embodiment of the present disclosure. FIG. 5 is a plot 130 of the relative difference in phase between noisy synthetic data and data simulated for nominal casing thicknesses using the modeling code used in the inversion, in accordance with an embodiment of the present disclosure. Both plots 130, 140 include a horizontal axis 122 representing the five receivers (1-5) of the logging tool 16, and a vertical axis 124 representing the six above frequencies (indexed as 1-6) operated by the logging tool 16. The vertical bar 126 indicates the relative difference between the synthetic data and data modeled with the inversion techniques, where a value of 0 represents no relative difference and each incremental value of 0.1 corresponds to a 10% difference with respect to a modeled response.

Figure 6:
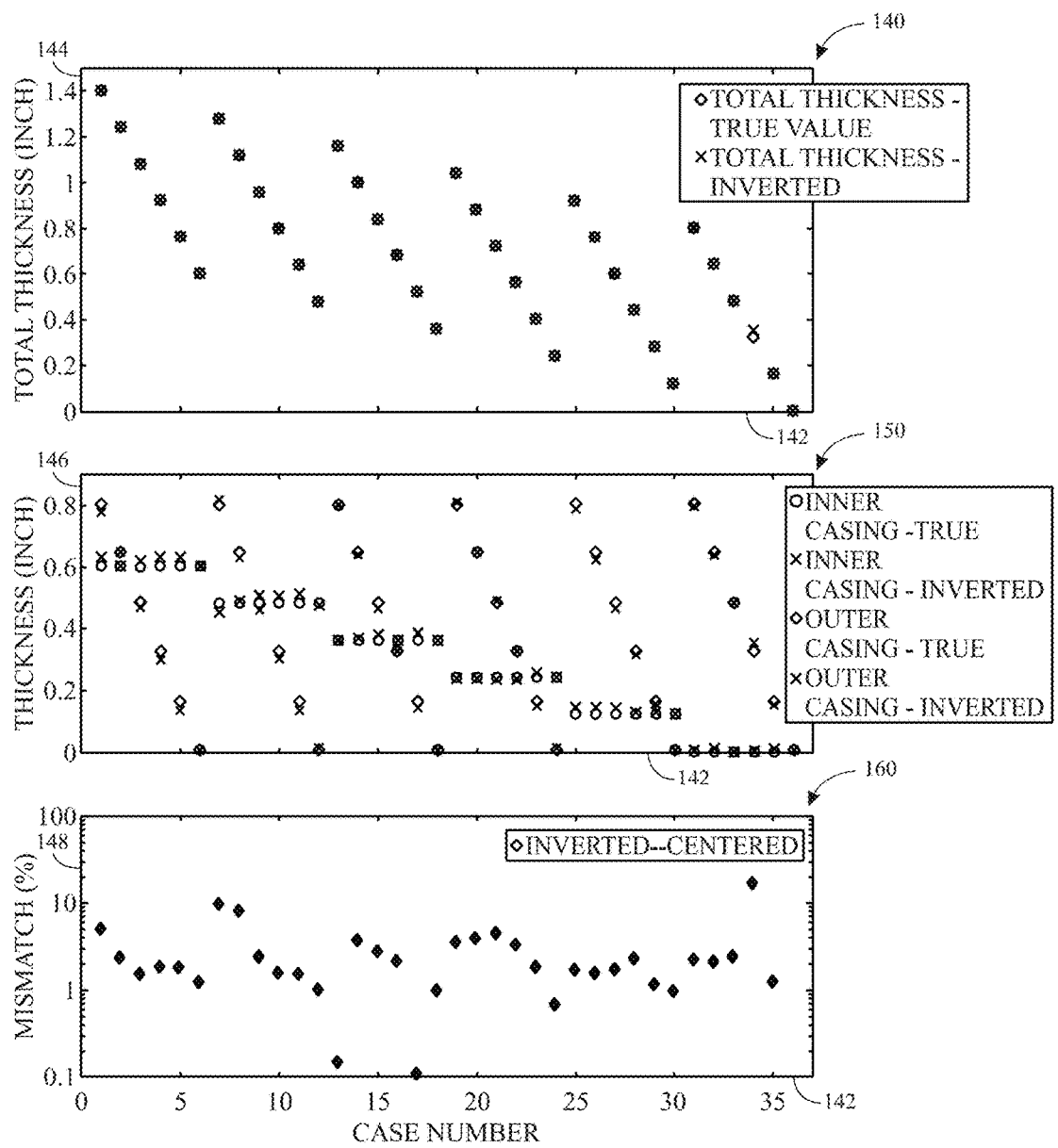
FIG. 6 is a set of three plots of inversion results, in accordance with an embodiment of the present disclosure.
Figure 9:
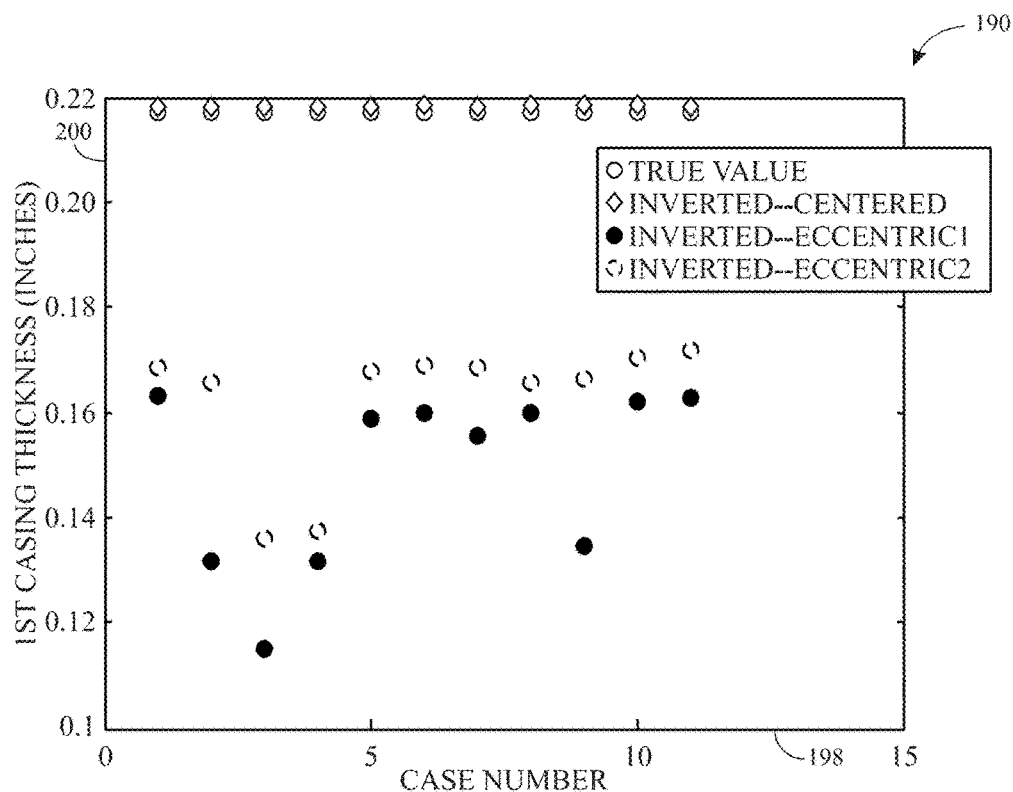
FIG. 9 is a plot of true and inverted individual casing thickness for synthetic data, in accordance with an embodiment of the present disclosure.
Figure 10:
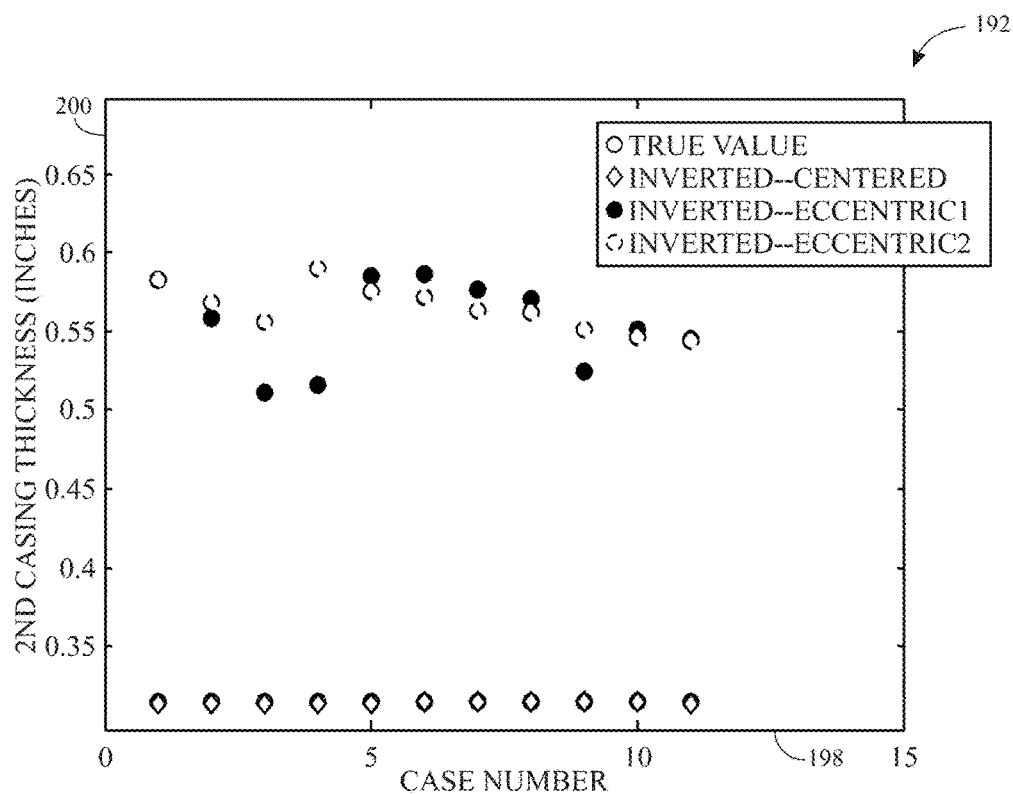
FIG. 10 is a plot of true and inverted individual casing thickness for synthetic data, in accordance with an embodiment of the present disclosure.
Figure 11:
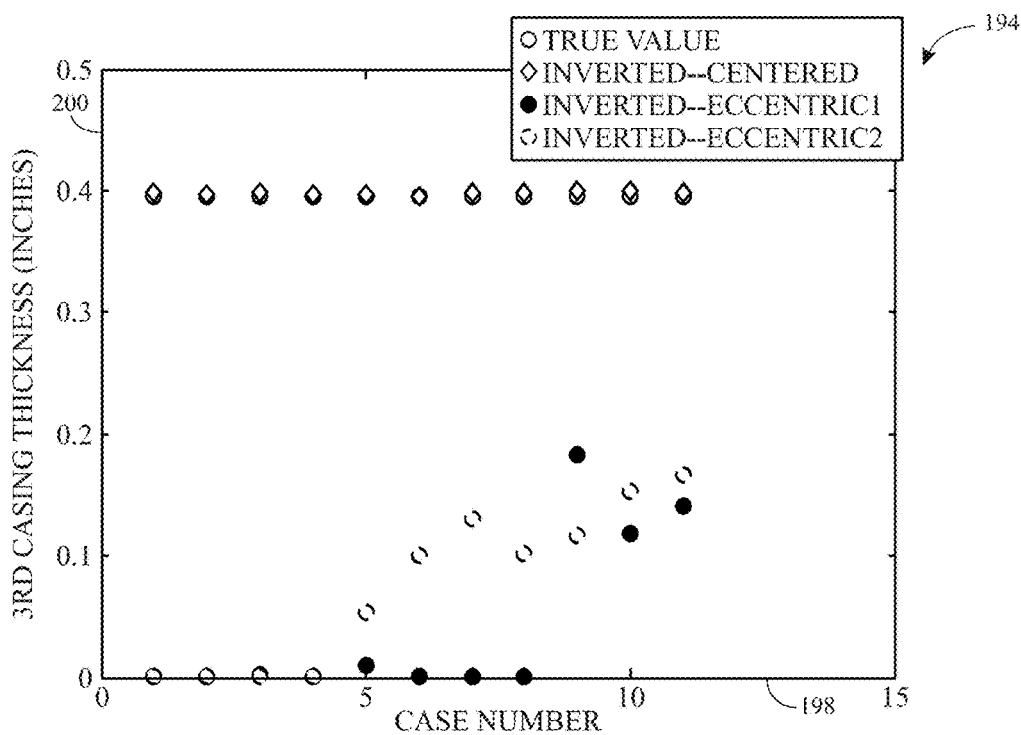
FIG. 11 is a plot of true and inverted individual casing thickness for synthetic data, in accordance with an embodiment of the present disclosure.
Figure 12:
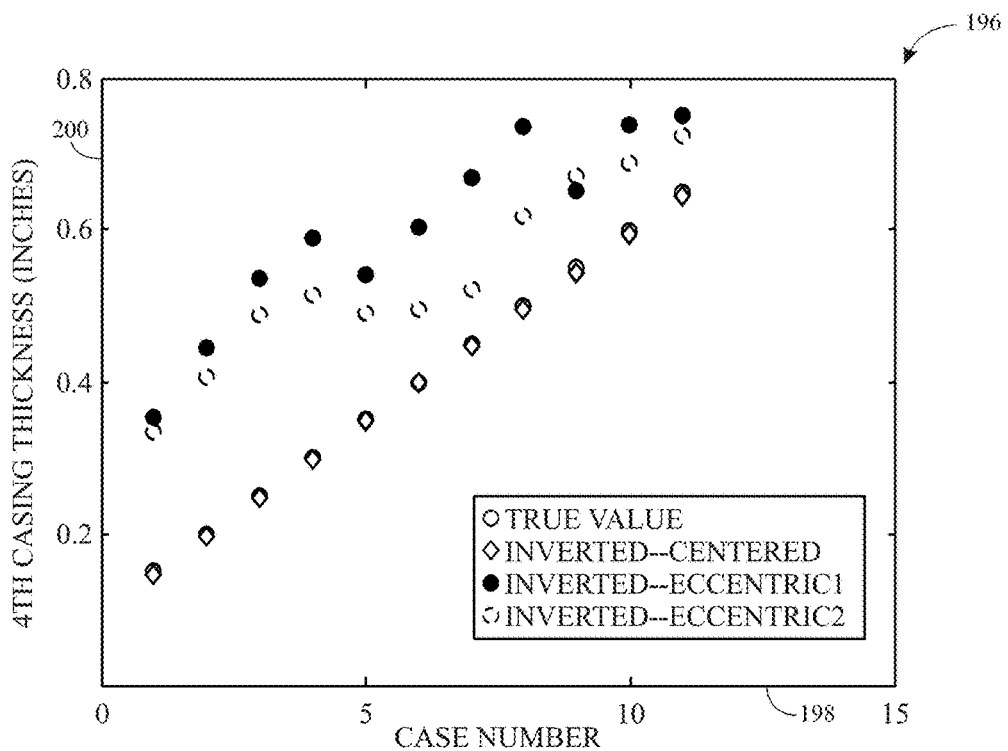
FIG. 12 is a plot of true and inverted individual casing thickness for synthetic data, in accordance with an embodiment of the present disclosure.

The noisy synthetic data was also inverted for the outer diameter of individual casings. FIG. 6 is a set of three plots 140, 150, 160 of the inversion results, in accordance with an embodiment of the present disclosure. Each plot 140, 150, 160 includes a horizontal axis 142 representing the thirty-six sets of synthetic data (by case number) generated for the two nested synthetic casings. The plot 140 includes a vertical axis 144 representing total thickness in inches of the two nested synthetic casings. The plot 140 compares the total thickness data (true value provided by the synthetic data) vs. the inversion-reconstructed total thickness values. The plot 150 includes a vertical axis 146 representing thickness in inches of each of the two nested casings. The plot 150 compares the true thickness data of the inner and outer casings vs. the inversion-reconstructed thickness of the inner and outer casings. The plot 160 includes a vertical axis 148 that represents and illustrates mismatch in percentage of differences between the noisy synthetic data vs. the simulated responses corresponding to the inversion-reconstructed models. As illustrated, the disclosed inversion technique performs well and accurately identifies thickness of individual casings.

The inversion techniques above may be used to identify eccentering of individual casings in the plurality of nested casings 12. In particular, a threshold comparison may be made using the mismatch percentages for data corresponding to all receivers of the logging tool 16 and for data corresponding to receivers of the logging tool 16 with only long spacings. A long spacing may be a distance of a receiver from a center of a transmitter 57 that is greater than three times the outer diameter of the outermost casing of the plurality of nested casings. It follows that a short spacing may be a distance of the receiver from the center of the transmitter 57 that is less than or equal to three times the outer diameter of the outermost casing of the plurality of nested casings 12. In some embodiments, a long spacing may be greater than (and a short spacing may be less than or equal to) two, two and a half, three and a half, or four times the outer diameter of the outermost casing of the plurality of nested casings. For example, FIGS. 7 and 8 are diagrams of two sets of eccentered casings 170, 172. A three-dimensional model was used to generate the synthetic data for the two sets of eccentered 170, 172 and one set of centered casings. The diagrams illustrate the arrangement and provide the outer diameter (in inches), the thickness (in inches), and the eccentering (in inches) for each casing 174, 176, 178, 180 of the eccentrically-arranged synthetic casings 170, 172.

The inversion techniques above were used to process the synthetic data for a centered configuration of casings and the two eccentered configurations of casings 170 and 172, wherein the inversion model assumes that the casings for all configurations are centered. FIGS. 9-12 are plots 190, 192, 194, 196 of the synthetic and inverted individual casing thickness data for each of the four casings 174, 176, 178, 180, in accordance with an embodiment of the present disclosure. The plots 190, 192, 194, 196 each include a horizontal axis 198 representing a set of synthetic data (by case number) and a vertical axis 200 representing the thickness of the particular casing 174, 176, 178, 180. In particular, the plots 190, 192, 194, 196 illustrate the inverted casing thickness data for the casings in the centered configuration and the two eccentered configurations, as well as that of the true casing thicknesses. As illustrated, the inverted data for the centered casings performs well, while the inverted data for the two sets of eccentered casings does not perform as well.

Figure 13:
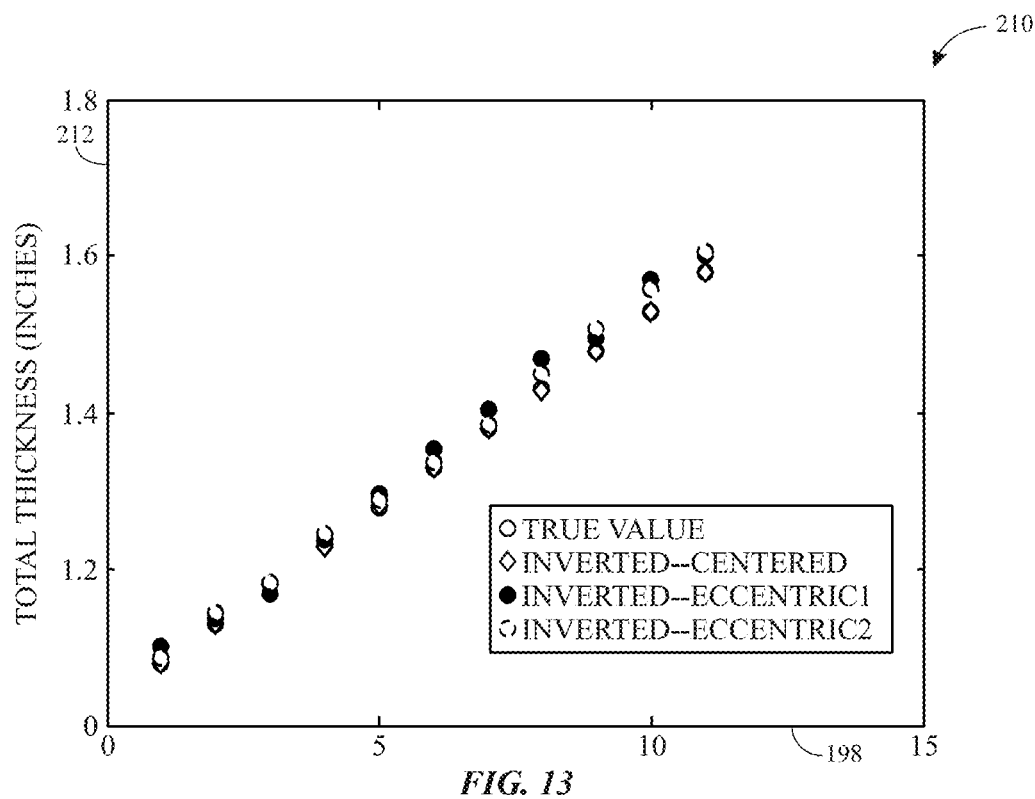
FIG. 13 is a plot of true and inverted total casing thickness for synthetic data, in accordance with an embodiment of the present disclosure.

FIG. 13 is a plot 210 of the synthetic and inverted total casing thickness data for all of the four casings 174, 176, 178, 180, in accordance with an embodiment of the present disclosure. The plot 210 includes the horizontal axis 198 representing a set of synthetic data (by case number) and a vertical axis 212 representing the total casing thickness. In particular, the plot 210 illustrates the inverted total casing thickness data as compared to the synthetic data (true value). As illustrated, the inverted data for the both the centered and the eccentered configurations performs well.

Figure 14:
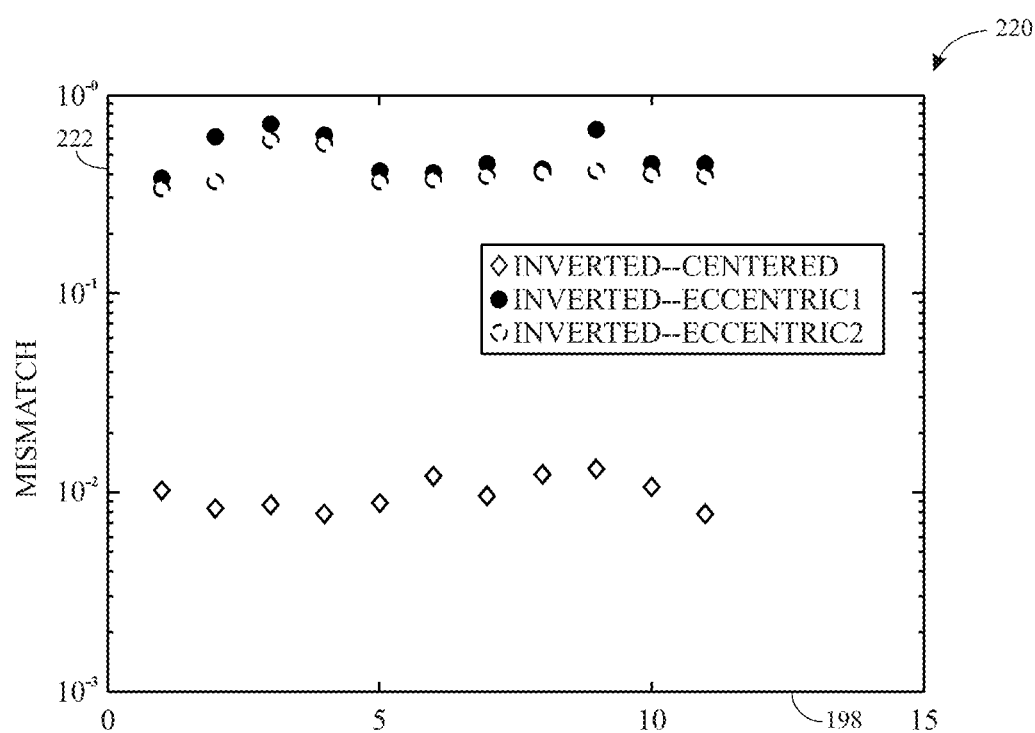
FIG. 14 is a plot of mismatches between synthetic and inversion reconstructed data, in accordance with an embodiment of the present disclosure.

FIG. 14 is a plot 220 of mismatches between the noisy synthetic data and simulated responses corresponding to the inversion-reconstructed casings in plots 190, 192, 194, 196, 210, in accordance with an embodiment of the present disclosure. The plot 220 includes the horizontal axis 198 representing a set of synthetic data (by case number) and a vertical axis 222 representing the mismatch as relative differences between the noisy synthetic data vs. the simulated responses corresponding to the inversion-reconstructed casings. In particular, the plot 220 illustrates the mismatch between the noisy synthetic data and the simulated responses corresponding to the inversion-reconstructed casings for the centered configuration, the noisy synthetic data and the simulated responses corresponding to the inversion-reconstructed casings for the first eccentered configuration 170, and the noisy synthetic data and the simulated responses corresponding to the inversion-reconstructed casings for the second eccentered configuration 172. As illustrated, there is a noticeable discrepancy between the mismatch of the inverted data for the centered casings and the mismatch of inverted data for the two sets of eccentered casings.

Figure 15:
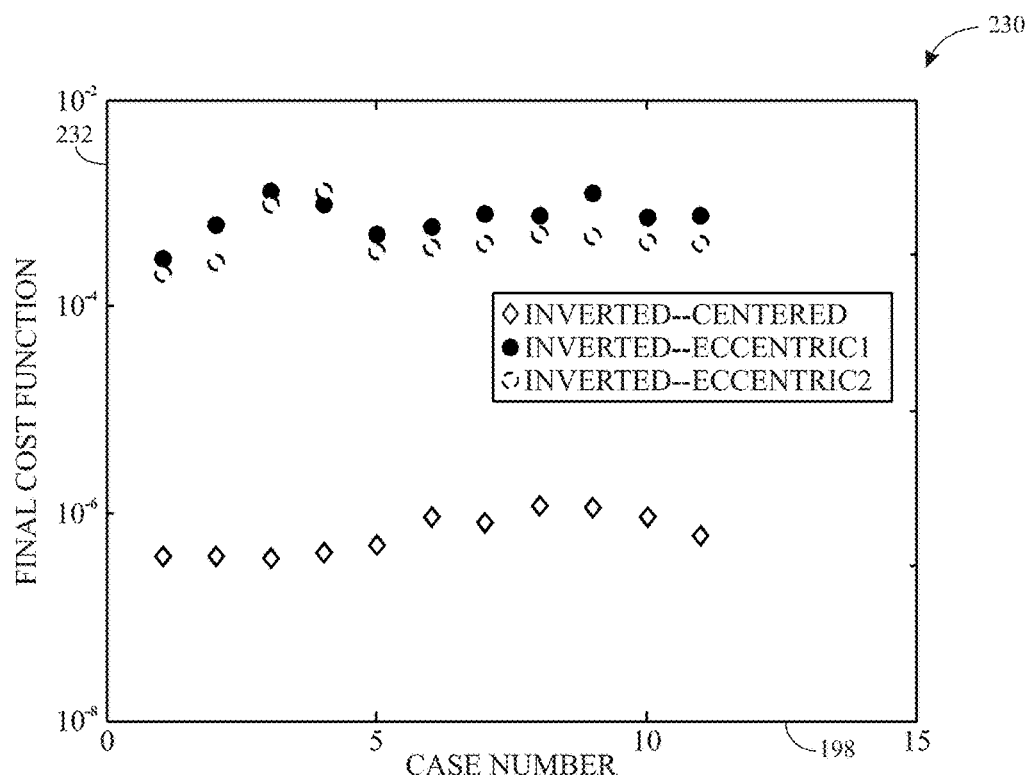
FIG. 15 is a plot of final cost functions for the different inversion cases, in accordance with an embodiment of the present disclosure.

FIG. 15 is a plot 230 of final cost functions for the inverted data in plots 190, 192, 194, 196, 210, in accordance with an embodiment of the present disclosure. The plot 230 includes the horizontal axis 198 representing a set of synthetic data (by case number) and a vertical axis 232 representing the final cost function value. In particular, the plot 230 illustrates the cost function of the inversions for the casings of the centered configuration and the casings of the two eccentered configurations 170, 172. As illustrated, there is a noticeable discrepancy between the final cost function of the inversion for the centered casings and the final cost function of the inversion for the two sets of eccentered casings.

Figure 16:
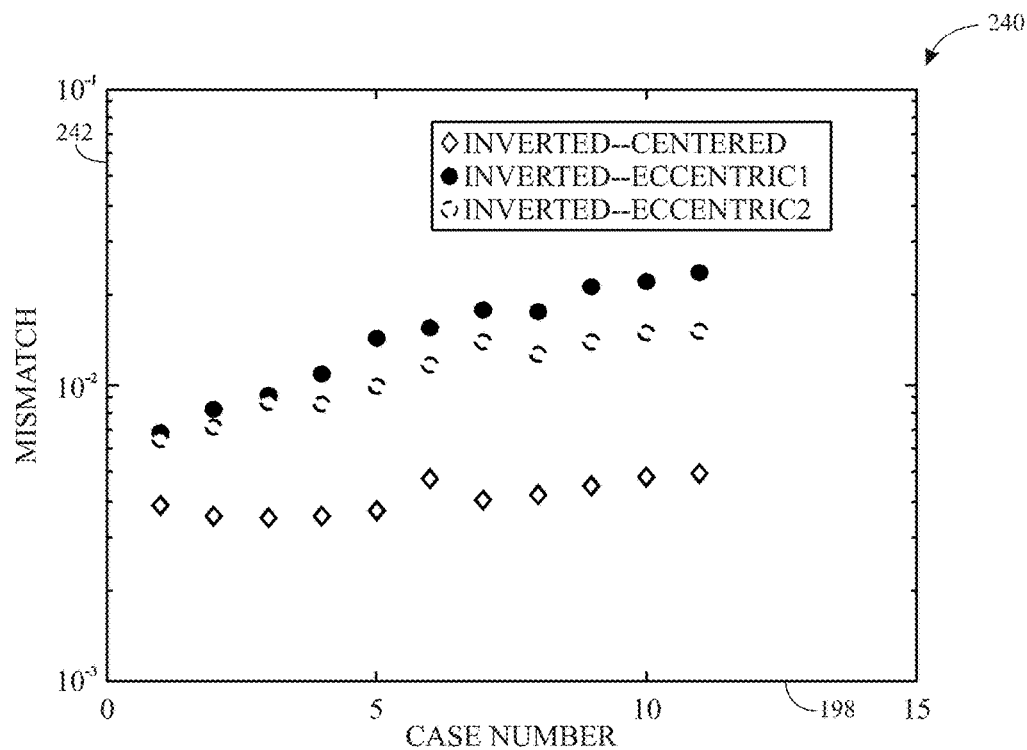
FIG. 16 is a plot of mismatches between synthetic and inversion reconstructed data corresponding to receivers with just long spacings, in accordance with an embodiment of the present disclosure.

FIG. 16 is a plot 240 of mismatches between the noisy synthetic and simulated responses for the inversion reconstructed casings corresponding to receivers of the logging tool 16 with only long spacings from the transmitter 57 in plots 190, 192, 194, 196, 210, in accordance with an embodiment of the present disclosure. A long spacing may be a distance of a receiver from a center of a transmitter 57 that is greater than three times the outer diameter of the outermost casing of the plurality of nested casings 12. The two sets of eccentered casings 170, 172 as shown in FIGS. 7 and 8 each have an outermost casing 180 that has an outer diameter of 13.375 in. The logging tool 16 that was modeled used five receivers with spacings of 18, 36, 60, 80, and 90 in. As such, the logging toll 16 includes three receivers with long spacings (that of 60 80, and 90 in).

The plot 240 includes the horizontal axis 198 representing a set of synthetic data (by case number) and a vertical axis 242 representing the mismatch as relative differences between the noisy synthetic data vs. simulated responses corresponding to the inversion reconstructed casings data. In particular, the plot 240 illustrates the mismatch between the synthetic data and the simulated responses corresponding to inversion reconstructed casings for the centered configuration, the synthetic data and the simulated responses corresponding to inversion reconstructed casings for the first eccentered configuration 170, and the synthetic data and the simulated responses corresponding to inversion reconstructed casings for the second eccentered configuration 172. As illustrated, there is a noticeable discrepancy between the mismatch of the inverted data for the centered casings and the mismatch of inverted data for the two sets of eccentered casings. However, the discrepancy is noticeably less than that of the data corresponding to receivers of the logging tool 16 that included those with short spacings, as seen in the plot 220 of FIG. 14. As a result, the discrepancy between the inverted data corresponding to receivers that include receivers with short spacings compared to the inverted data corresponding to receivers with only long spacings may be used as an indicator of casings that are eccentrically arranged.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system comprising:
a plurality of nested casings disposed in a well;
an electromagnetic logging tool disposed in the plurality of nested casings, wherein the electromagnetic logging tool comprises one or more transmitters and a plurality of receivers; and
a data processing system communicatively coupled to the electromagnetic logging tool, wherein the data processing system comprises one or more processors, wherein the one or more processors are configured to:
obtain a set of induction, multi-spacing, multi-frequency measurements of the plurality of nested casings;
invert the set of measurements for a set of characteristics of the plurality of nested casings;
calibrate the set of measurements using differences between measured responses of the electromagnetic logging tool, and simulated responses of the electromagnetic logging tool resulting from inverting the set of measurements for the one or more known values of the set of characteristics; and
invert the calibrated set of measurements for a first characteristic of individual casings of the plurality of nested casings to determine data corresponding to the first characteristic of the individual casings.

2. The system of claim 1, wherein the set of characteristics includes magnetic permeability or electrical conductivity of the plurality of nested casings.

3. The system of claim 1, wherein the set of characteristics includes an inner diameter or an outer diameter of individual casings of the plurality of nested casings.

4. The system of claim 1, wherein the one or more known values of the set of characteristics are provided by ultrasonic measurement.

5. The system of claim 1, wherein the first characteristic is a thickness of individual casings of the plurality of nested casings.

6. The system of claim 1, wherein the plurality of nested casings are centered.

7. The system of claim 1, wherein the plurality of nested casings are eccentered.

8. The system of claim 1, wherein the electromagnetic logging tool operates from 0.1 to 50 Hertz.

9. A tangible, non-transitory, machine-readable medium, comprising machine-readable instructions to:
obtain a set of induction, multi-spacing, multi-frequency measurements of a plurality of nested casings using a logging tool;
invert the set of measurements for a set of characteristics of the plurality of nested casings;
calibrate the set of measurements using differences between measured responses of the logging tool, and simulated responses of the logging tool resulting from inverting the set of measurements for the one or more known values of the set of characteristics; and
invert the calibrated set of measurements for a first characteristic of individual casings of the plurality of nested casings to determine data corresponding to the first characteristic of the individual casings.

10. The machine-readable medium of claim 9, wherein the set of characteristics includes magnetic permeability of the plurality of nested casings.

11. The machine-readable medium of claim 9, wherein the set of characteristics includes electrical conductivity of the plurality of nested casings.

12. The machine-readable medium of claim 9, wherein the first characteristic is a thickness of individual casings of the plurality of nested casings.

13. The machine-readable medium of claim 9, wherein the first characteristic is magnetic permeability or electrical conductivity of the plurality of nested casings.

14. The machine-readable medium of claim 9, wherein the first characteristic is a cross-section center of individual casings of the plurality of nested casings.

15. A method comprising:
obtaining, with a plurality of receivers of a logging tool, a set of induction, multi-spacing, multi-frequency measurements of a plurality of nested casings;
inverting, with a processor, the set of measurements for magnetic permeability or electrical conductivity;
calibrating, with the processor, the set of measurements using differences between measured responses of the logging tool, and simulated responses of the logging tool resulting from inverting the set of measurements for the magnetic permeability or electrical conductivity of the plurality of nested casings, to determine a calibrated set of measurements; and
inverting, with the processor, the calibrated set of measurements for thickness of individual casings of the plurality of nested casings, to determine the thickness of the individual casings.

16. The method of claim 15, wherein inverting, with the processor, the set of measurements for magnetic permeability or electrical conductivity, comprises assuming a nominal thickness of the plurality of nested casings.

17. The method of claim 15,
wherein:
obtaining, with the plurality of receivers of the logging tool, the set of induction, multi-spacing, multi-frequency measurements of the plurality of nested casings comprises:
obtaining a first measurement set corresponding to receivers of the plurality of receivers that comprise short spacings; and
obtaining a second measurement set corresponding to receivers of the plurality of receivers that only comprise long spacings; and
inverting, with the processor, the calibrated set of measurements for thickness of the individual casings of the plurality of nested casings, comprises:
determining a first inversion mismatch based on the first measurement set; and
determining a second inversion mismatch based on the second measurement set.

18. The method of claim 17, comprising determining whether the plurality of nested casings are eccentered based on coherency between the first inversion mismatch and the second inversion mismatch.

19. The method of claim 17, wherein the short spacings comprise distances from a transmitter of the logging tool that are less than or equal to three times an outer diameter of the outermost casing of the plurality of nested casings.

20. The method of claim 17, wherein the long spacings comprise distances from a transmitter of the logging tool that are greater than three times an outer diameter of the outermost casing of the plurality of nested casings.

* * * * *